March 14, 1933.  R. T. STEINDORF  1,901,851
SCRAPER FOR SHAFT BEARINGS
Filed Nov. 2, 1931
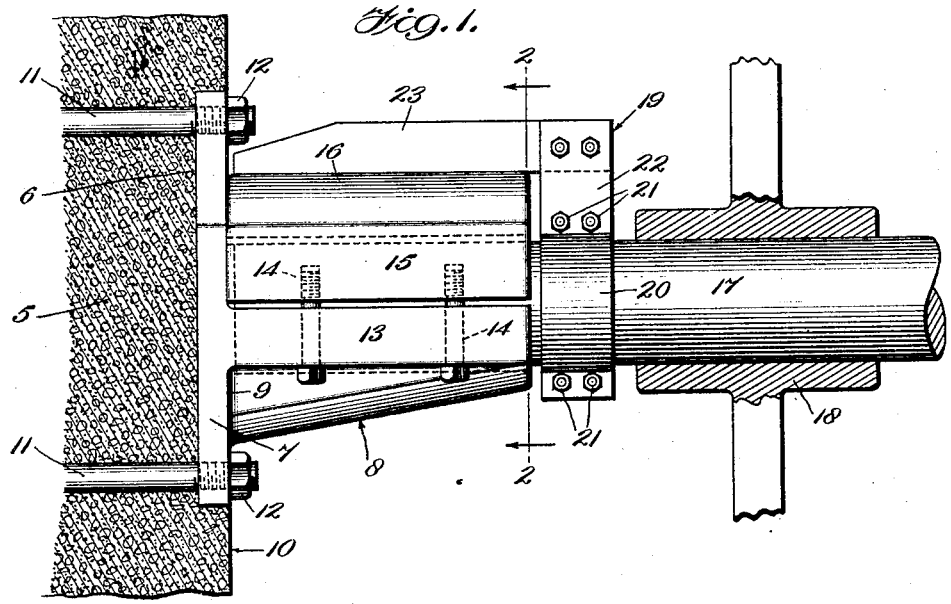
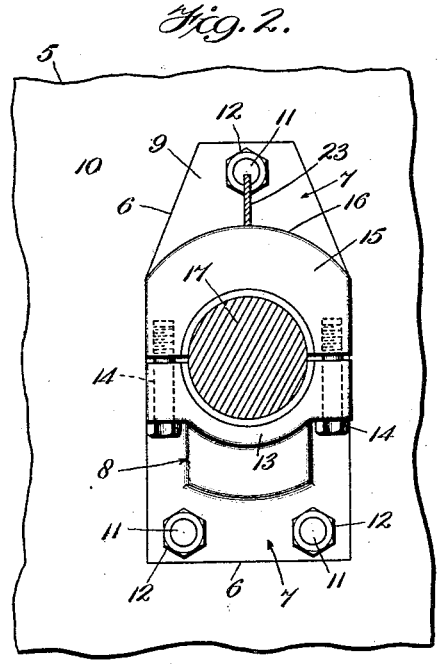
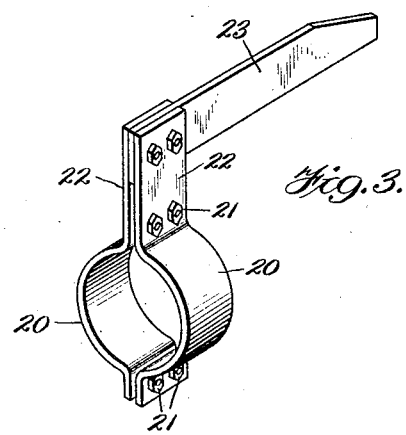
Inventor
Robert T. Steindorf,
By Barker & Collings
Attorneys Patented Mar. 14, 1933

1,901,851

UNITED STATES PATENT OFFICE

ROBERT T. STEINDORF, OF MILWAUKEE, WISCONSIN, ASSIGNOR TO CHAIN BELT COMPANY, OF MILWAUKEE, WISCONSIN, A CORPORATION OF WISCONSIN

SCRAPER FOR SHAFT BEARINGS

Application filed November 2, 1931. Serial No. 572,694.

This invention relates to apparatus for removing accumulations of material from shaft bearings and has for one of its objects to provide a device of this character which will be especially, although not solely, adapted for use in the settling tanks of sewage disposal apparatus.

One well known form of sewage disposal apparatus comprises one or more settling tanks or receptacles which are usually constructed of concrete and in which there is provided an apparatus for removing the settled solids, comprising an endless chain conveyor having sludge removing flights. The chains of such sludge removers are trained about sprocket wheels carried by shafts which are usually horizontal and extend substantially from one side wall of the tank to the other, which shafts are journalled in bearings supported by the side walls or otherwise and submerged in the liquid which is being purified. The solids contained in such liquid are highly putrefactive, and if in the process of coagulation and settling they are permitted to collect upon the outer surface of the journal bearings putrefaction is stimulated with its attendant disagreeable odors. On the other hand, so long as the solids are kept in motion the tendency to putrefy is greatly reduced or eliminated and it is therefore highly desirable that collections of such solids upon the exposed journal bearing surfaces be either prevented or constantly removed.

The present invention has therefore for its principal object the provision of a journal bearing and means associated therewith whereby accumulations of solid materials which may form upon the upper exposed faces of the submerged bearing may be continually scraped off so that they may continue their settling to the bottom of the tank where they are constantly removed by the sludge removers.

With the above and other objects in view which will appear as the description proceeds, the invention consists in the novel details of construction and combinations of parts more fully hereinafter described and particularly pointed out in the appended claims.

Referring to the accompanying drawing forming a part of this specification in which like reference characters designate like parts in all the views:—

Figure 1 is a vertical sectional view through a portion of a wall of a settling tank, such for example as that commonly employed in sewage disposal, showing a journal bearing constructed in accordance with the present invention secured thereto, as well as means carried by the shaft journalled in said bearing for removing accumulations of matter from the upper surface of the bearing;

Figure 2 is a cross sectional view taken approximately on the plane indicated by the line 2—2 of Figure 1, looking in the direction of the arrows; and Figure 3 is a detail perspective view of the scraper device forming part of the present invention.

In the said drawing 5 indicates the wall of a settling tank, such for example as is used in sewage disposal, which wall is recessed as at 6 for the reception of flange 7 of the journal bearing bracket 8. The recess 6 formed in the wall 5 is of such dimensions as to receive flange 7 so that its outwardly facing surface 9 is substantially flush with the surface 10 of the wall 5. The latter has suitable bolts or studs 11 embedded in it, which pass through the flange 7 and receive nuts 13 which hold the flange and bracket in place, as will be readily understood.

The bracket 8 in addition to the flange 7 comprises a horizontal extension 13 rigid with the said flange, which projects outwardly from the vertical surface 9 and into the tank. The extension 13 may be in the form of a solid bearing boss, but it is preferred to make it in the form of a half bearing to which is secured as by the bolts 14 the bearing cap 15. The upper surface 16 of said cap is curved on an arc which is concentric with the axis of the bearing, and since the remaining surfaces of the cap as well as of the extension 13 are either vertical or face downwardly, the surface 16 is the only one on which the settling solids may accumulate.

A rotatable shaft 17 is journalled within the bearing and may carry the sprocket wheel, a portion of which indicated at 18, about which the sludge remover chain passes.

In order to remove any solids which may accumulate upon the surface 16 there is provided a scraper device 19, which as here shown comprises a pair of clamping members 20 which are adapted to be tightly clamped upon the shaft 17 adjacent the end of the bearing by means of suitable bolts 21. The members are provided with the spaced radial extensions 22 between which is clamped the scraper bar 23 which extends over the bearing cap 15 in position to sweep across its curved surface 16 as the shaft is rotated, thereby removing any solids which may have deposited on such surface. These solids of course after being so removed, continue their downward course through the liquid to the bottom of the tank where they are removed by the sludge removers in the usual manner.

It is highly important in sewage disposal apparatus to prevent as far as possible any agitation of the settling solids since agitation will break up the floc and again distribute the solids in suspension throughout the liquid, with the effect of causing them to require a much greater time to resettle. In the present instance the rotation of the shaft 17 is relatively slow so that the movement of the scraper device 19, while sufficient to remove such solids as may deposit upon the surface 16 at such frequent intervals as to prevent putrefaction thereof, is at the same time slow enough as not to violently agitate the settling solids and cause them to be redistributed throughout the liquid.

While the scraper device has been here shown as clamped to and rotated with the shaft it obviously could be equally well applied to the sprocket such as 18, or it could be moved indirectly by the shaft rather than directly.

While one form of the invention has been illustrated and described it is obvious that those skilled in the art may vary the details of construction as well as the precise arrangement of parts without departing from the spirit of the invention, and therefore it is not wished to be limited to the above disclosure except as may be required by the claims.

What I claim is:

1. In a settling tank for sewage and the like having a wall, a bearing bracket secured to said wall, provided with an extension projecting into said tank which is subject to the deposit of solids thereon; a shaft journalled in said bracket; and means carried by said shaft for removing any solids which may deposit on said bracket.

2. In a settling tank for sewage and the like having a wall, a bearing bracket secured to said wall, provided with an extension projecting into said tank which is subject to the deposit of solids thereon; a shaft journalled in said extension; and means rotatable by said shaft for removing any solids which may deposit on said extension.

3. In a settling tank for sewage and the like having a substantially vertical wall, a bearing bracket provided with a flange set into said wall with its outward surface flush with the surface of said wall, said bracket having an extension projecting into said tank which is subject to the deposit of solids thereon; a shaft journalled in said extension; and means carried by said shaft for removing any solids which may deposit on said extension.

4. In a settling tank for sewage and the like having a substantially vertical wall, a bearing bracket provided with a flange set into and secured to said wall with its outward surface flush with the surface of said wall, said bracket having a horizontal extension projecting into said tank, said extension having a curved surface which is subject to the deposit of solids thereon; a shaft journalled in said extension; and a scraper carried by said shaft adapted to sweep said curved surface as the shaft rotates to remove deposited solids therefrom.

5. In a settling tank for sewage and the like having a substantially vertical wall, a bearing bracket provided with a flange set into and secured to said wall with its outward surface flush with that of said wall, said bracket having a horizontal extension projecting into said tank, said extension having an upwardly facing curved surface which is subject to the deposit of solids thereon; a shaft journalled in said extension; a radial arm carried by said shaft adjacent said extension; and a scraper bar carried by said arm extending over and adapted to sweep said curved surface as the shaft rotates to remove deposited solids therefrom.

6. The combination with a journal bearing for submergence in a liquid carrying solid matter in suspension, said bearing having a surface which is subject to the accumulation of said solid matter thereon, and a shaft journalled in said bearing, of means arranged to engage and move across said surface to remove such accumulations without material agitation of the surrounding liquid and suspended matter.

7. The combination with a journal bearing for submergence in a liquid carrying finely divided solid matter in suspension, said bearing having a surface which is subject to the accumulation of said solid matter thereon, and a shaft journalled in said bearing for rotation at low speed, of means rotatable with said shaft for moving across said surface to remove such accumulations, without material agitation of the surrounding liquid and suspended matter.

8. The combination with a journal bearing having a surface which is subject to the accumulation of matter thereon; and a shaft journalled in said bearing, of a scraper secured to said shaft adjacent said bearing and extending thereover in position to sweep said surface as the shaft rotates to remove such accumulations.

9. A scraper for removing accumulations from shaft bearings, comprising a pair of members adapted to be clamped about a shaft adjacent the bearing; and a scraper element carried by said members in position to extend over said bearing and sweep the surface thereof which is to be cleaned.

In testimony whereof, I affix my signature.
ROBERT T. STEINDORF.